Patented Jan. 8, 1935

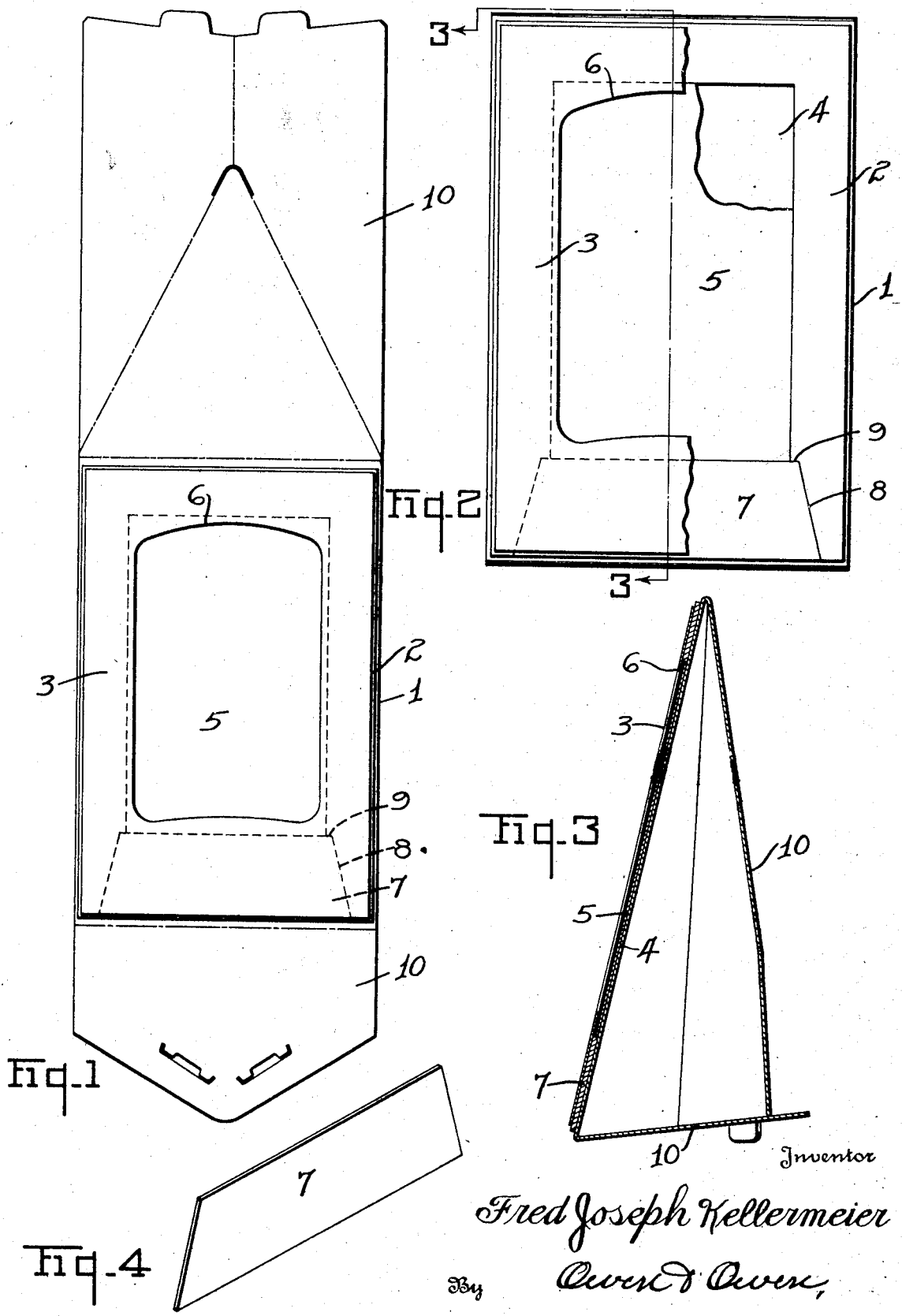

1,987,111

UNITED STATES PATENT OFFICE 1,987,111

PHOTO MOUNT

Fred Joseph Kellermeier, Toledo, Ohio, assignor to Gross Photo Supply Company, Toledo, Ohio, a corporation of Ohio Application June 4, 1934, Serial No. 728,923

1 Claim. (Cl. 40—149)

This invention relates to photo mounts of either the plain holder or easel type, and has for its primary object the provision of simple and efficient means in connection with such a mount to facilitate the insertion into and removal from the mount of photos without bending or distorting same, and at the same time serving to retain them in position in the mount.

The invention is fully described in the following specification, and one embodiment thereof illustrated in the accompanying drawing, in which—

Figure 1 is a plan view of a mount of the easel or folder type with the folder opened up in flat-form. Fig. 2 is a face view of the mount set up in easel or display form with a photo in position therein and with parts broken away. Fig. 3 is a section on the line 3—3 in Fig. 2, and Fig. 4 is a perspective view of the member which closes the opening or passage through which the photo is inserted into the mount.

Referring to the drawing, 1 designates the card or backing member of the mount, 2 an insert and 3 a facing member, mounted one over another, preferably by pasting or in any other suitable manner.

The insert 2 has an opening therein which cooperates with the backing member 1 to form a recess 4, which is of suitable size and shape to receive the photo member 5. While the recess 4, in the present instance, is formed by the members 1 and 2, it is apparent that it may be formed alone by the member 2 by merely recessing its surface sufficiently to receive the photo.

The facing member 3 has an opening 6 therein through which the photo is exposed, such opening being smaller than the recess 4, so that its edge wall overlaps the edge of a photo mounted in the recess entirely therearound, as is customary with mounts of this character. Such opening may be of any suitable contour.

In carrying out my invention, the insert 2 is provided at one side edge of the photo, in the present instance at the bottom edge, with a removable part 7, which is at least coextensive in length with the associated side of the photo, so that when said part is removed from the insert 2, it provides a passage between the adjacent portions of the members 1 and 3 through which the photo may be introduced into the recess 4 or removed therefrom in flat form. It is thus apparent that the insert 2 is made in two pieces, one being of U-form and the other constituting a strip for closing the space between the U-legs at the free ends thereof.

The part 7 is left free or uncemented with respect to the members 1 and 3 to permit its removal therefrom, and its ends are cut on an outward taper as shown at 8, so that the part is of wedge-form and the ends of the passage formed by its removal from the insert are complemental thereto. Said part is also cut from the insert in a manner to form shoulders 9 at each end to positively limit its extent of inward movement in the insert.

The part 7, which forms a closure for the passage through which a photo may be inserted into the recess 4, is frictionally held in such passage both by the wedge coaction of the part with the insert and by the opposed binding action of the members 1 and 3 thereagainst.

If the mount is of the easel or folder type, as illustrated, the part 7 is preferably disposed at one of the sides of the mount to which the flaps or extensions 10 are attached, so that when the flaps are folded over the face of the mount the associated flap prevents removal of the part 7.

In the use of a mount embodying the invention, it is apparent that upon a removal of the part 7 from the insert 2, a photo 5 may be inserted into the recess 4 through the passage thus provided, and that when it is desired to remove a photo from the mount, this may be easily accomplished by pushing the photo in the direction of the part 7, so as to force it out of the insert at the same time the photo is forced therefrom.

I wish it understood that my invention is not limited to any specific construction, arrangement or form of the parts, as it is capable of numerous modifications and changes without departing from the spirit of the claim.

Having thus described my invention, what I claim as new, and desire to secure by United States Letters Patent, is:

In a photo mount, a backing member having a flap connected to one side thereof for folding over the face of the mount, an insert mounted on the backing member and cooperating therewith to form a photo-receiving recess, and a facing member mounted on the insert and having an opening in register with said recess with its marginal edge wall overlapping the edge portion of the recess, said insert at the side thereof adjacent to the fold line of said flap having a part removable therefrom to provide a passage between the adjacent portions of the backing and facing members for the insertion of a photo into said recess, said passage being coextensive in width with the width of the adjacent side of said recess, said flap, when folded over the face of the backing member, serving to retain said removable part in position in said passage.

FRED JOSEPH KELLERMEIER.